(12) United States Patent
Nechitailo

(10) Patent No.: US 6,859,591 B2
(45) Date of Patent: Feb. 22, 2005

(54) GEL-SWELLABLE PARTICLES AND YARNS IN GEL-FILLED BUFFER TUBES

(75) Inventor: Nicholas V. Nechitailo, Conover, NC (US)

(73) Assignee: Alcatel, Paris (FR)

( * ) Notice: Subject to any disclaimer, the term of this patent is extended or adjusted under 35 U.S.C. 154(b) by 16 days.

(21) Appl. No.: 10/012,283

(22) Filed: Dec. 12, 2001

(65) Prior Publication Data
US 2003/0108308 A1 Jun. 12, 2003

(51) Int. Cl.⁷ ................................................. G02B 6/44
(52) U.S. Cl. ..................................................... 385/109
(58) Field of Search .................................. 385/100, 107, 385/109, 110, 111, 112, 113

(56) References Cited

U.S. PATENT DOCUMENTS

| | | |
|---|---|---|
| 4,324,453 A | 4/1982 | Patel |
| 4,839,970 A | 6/1989 | Goetze et al. |
| 5,157,752 A | 10/1992 | Greveling et al. |
| 5,218,011 A | 6/1993 | Freeman |
| 5,295,215 A | 3/1994 | Fedoroff et al. |
| 5,384,880 A | 1/1995 | Keller et al. |
| 5,621,841 A | 4/1997 | Field |
| 5,630,003 A | 5/1997 | Arroyo |
| 5,684,904 A | 11/1997 | Bringuier et al. |
| 5,689,601 A | 11/1997 | Hager et al. |
| 5,698,615 A | 12/1997 | Polle |
| 5,838,863 A | 11/1998 | Fujiura et al. |
| 5,905,833 A | 5/1999 | Sheu |
| 6,085,009 A | 7/2000 | Risch et al. |
| 6,122,424 A | 9/2000 | Bringuier |
| 6,167,180 A | 12/2000 | Keller |
| 6,178,278 B1 | 1/2001 | Keller et al. |

FOREIGN PATENT DOCUMENTS

| | | |
|---|---|---|
| GB | 1 535 840 | 12/1978 |
| WO | WO 88/10000 | 12/1988 |

*Primary Examiner*—Son V. Nguyen
(74) *Attorney, Agent, or Firm*—Sughrue Mion, PLLC

(57) ABSTRACT

A fiber optic buffer tube containing fiber optic ribbons centrally located within the buffer tube and a gel compound surrounding the fiber optic ribbons. Disposed within the gel compound, between the walls of the buffer tube and the fiber optic ribbons are gel swellable yarns and/or particles. The gel swellable yarns/particles volumetrically expand when in contact with the gel compound causing greater force to hold the gel compound in place, especially when the fiber optic buffer is heated. The gel swellable yarns/particles also provide greater surface area and help to prevent the fiber optic ribbons from coming into contact with the walls of the buffer tube, thereby preventing signal attenuation problems.

39 Claims, 11 Drawing Sheets

GEL-SWELLABLE PARTICLES AND YARNS IN GEL-FILLED BUFFER TUBES

BACKGROUND OF THE INVENTION

1. Field of the Invention

The present invention relates generally to gel compounds within conduits or buffer tubes and more specifically to the reduction of dripping of the gel compounds at higher temperatures.

2. Description of Related Art

Fiber optic cables have been used by the telecommunications industry for a number of years to transmit information at very high rates over long distances. Fiber optic cables come in a variety of configurations, including: cables with a centrally located single buffer tube containing one or more optical fibers; cables with a plurality of buffer tubes stranded in a helical or alternating helical arrangement about a central strength member; and cables with slotted cores in which a plurality of optical fibers reside.

The buffer tubes within the ribbon cable generally contain one or more fiber optic ribbons centrally located within the buffer tube and a gel compound surrounding the optical fiber ribbons. An example of this can be seen in FIGS. 1–4. As shown in these figures, the fiber optic ribbons 3 are centrally located within buffer tube 1. As can be further seen from FIGS. 1–4, a gel compound 2 surrounds the fiber optic ribbons 3. The gel compound 2 serves a number of purposes. One purpose is to provide a cushioning media between the buffer tube 1 and the fiber optic ribbons 3 to thereby prevent the fiber optic ribbons 3 from contacting the sides of the buffer tube 1. The cushioning media dissipates radial crushing force and in addition, the gel compound 2 provides delayed motion response to the fibers under scanning bending loads. Such loads occur during the installation, when cables are pulled around the corners of the ducts or over the sheaves. The same applies to the earlier stages of manufacture when buffer tube 1 is bent over the sheaves and radially compressed by caterpillars. The artificial increase in the inertia of the ribbons 3 is provided by the viscous gel media and results in time delay for fibers to accommodate the load and to move slower than in a non-gel media toward the tube walls 1. When the fiber optic ribbons 3 contact the sides of the buffer tube 1, signal attenuation problems occur due to micro-bending and high stress. The gel compound 2 also serves to prevent exterior items from coming into contact with the fiber optic ribbons 3 if the buffer tube 1 is penetrated. For example, the gel compound 2 protects the fiber optic ribbons 3 from water that might penetrate the buffer tube 1.

Several problems occur in these conventional buffer tubes, especially ones in which the buffer tube 1 diameter is large (for example, greater than 0.310 inches). First, when the temperature of the gel compound 2 increases, the viscosity and yield stress of the gel compound 2 decreases. If the yield stress of the gel decreases below a critical value, the gel compound 2 may begin to flow. For example, if the buffer tube 1 is physically positioned in a vertical manner, as shown in FIG. 5, and the buffer tube 1 is heated, the gel compound 2 within the buffer tube 1 may begin to flow towards the bottom of the buffer tube 1, leaving a cavity 4.

In more detail, as the temperature of the buffer tube 1 increases, the buffer tube 1 expands, thereby increasing the diameter and length of the buffer tube 1, according to the difference between the coefficient of thermal expansion ("CTE") of the buffer tube material 1 and gel compound 2.

As for the gel compound 2, as noted above, as its temperature increases, the viscosity and yield stress of the gel compound 2 decreases. As shown in FIG. 5, gravity provides a downward force to the gel compound 2 while frictional forces (F1 and F2) with the tube wall are transmitted through the material by the yield stress of the gel compound 2. Friction between the gel compound 2 and the buffer tube 1 is labeled F1 while the fiction between the gel compound 2 and the fiber optic ribbons 3 is labeled F2. Consequently, as the temperature of the gel compound 2 increases, the yield stress of the gel compound 2 decreases and the ability of the gel to transmit friction forces F1 and F1 through the gel compound 2 decreases. Since the downward force of gravity remains constant during an increase in temperature of the gel compound 2, when the temperature of the gel compound 2 increases, the downward force of gravity on the material becomes greater than the upward force that can be transmitted through the material through the yield stress of the gel compound 2. As a result, the gel compound 2 may flow downward.

Additionally, gel compound 2 may be "forced" out of the buffer tube 1 when heated due to the difference between the CTE of the buffer tube 1 and the CTE of the gel compound 2. As stated earlier, when heated, both the buffer tube 1 and the gel compound 2 expand according to their respective CTE. If the CTE of the buffer tube 1 is less than the CTE of the gel compound 2, then the gel compound 2 expands more than the buffer tube 1. Since the gel compound 2 is expansionally limited in the radial direction by the buffer tube 1, if the gel compound 2 expands more than the buffer tube 1 when heated, the additional expansion of the gel compound 2 is directed in the axial direction. As a result, gel compound 2 is "forced" out of the ends of the buffer tube 1.

Once the gel compound 2 flows out of the buffer tube 1, it does not provide adequate protection to the fiber optic ribbons 3. The fiber optic ribbons 3 tend to contact the buffer tube walls 1, which in turn may cause attenuation problems. Additionally, gel compound 2 flowing out of the buffer tubes 1 will flow into splice enclosures which make later access to the closures problematic. Therefore, it is an object of the present invention to improve the compound flow performance of gel-filled fiber optic cables.

SUMMARY OF THE INVENTION

According to one aspect of the invention, optical fibers are provided in a conduit along with gel swellable material and a gel compound. In one of the preferred embodiments, the conduit is a buffer tube.

More specifically, the present invention solves the above-described problems and limitations by placing gel swellable yarns and/or gel swellable particles within the gel-filled conduits or buffer tubes. The gel swellable yarns and particles, when in contact with the gel compound (especially when heated), begin to swell. As a result, the yarns/particles provide many beneficial effects. First, the gel swellable yarns/particles absorb the lower viscosity component of the gel compound, thereby reducing the likelihood of oil separation. Second, the swelling of the yarns/particles push outward on the gel compound, thereby increasing the friction forces F1 and F2 that help to hold the gel compound in place. Third, the yarns/particles themselves provide surface area for the gel compound to contact which in turn provides additional friction forces that help to keep the gel compound from flowing downward. Fourth, the swelling of the yarns/particles helps to compensate for the expansion of the buffer tube walls due to the increase in temperature by making the expansion and CTE of the gel-yarn or gel-particle system closer to that of the buffer tube material.

In a preferred embodiment of the present invention, gel swellable yarns having whiskers are disposed between the fiber optic ribbon stacks and the walls of the buffer tube. The gel swellable yarns vary in size and surround the fiber optic ribbon stacks.

In another embodiment of the present invention, gel swellable particles having whiskers are embedded in the gel compound. The gel swellable particles are sub-millimeter sized and preferably made of a polyolefin-type material. The gel swellable particles are mixed with the gel compound before the buffering step.

In yet another embodiment of the present invention, both gel swellable yarns and particles are embedded in the gel compound.

Further objects, features and advantages of the invention will become apparent from a consideration of the following description and the appended claims when taken in connection with the accompanying drawings.

BRIEF DESCRIPTION OF THE DRAWINGS

The above aspects of the present invention will become more apparent by describing in detail embodiments thereof with reference to the attached drawings, in which.

DETAILED DESCRIPTION OF THE PREFERRED EMBODIMENTS

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to one skilled in the art.

Figure 6:
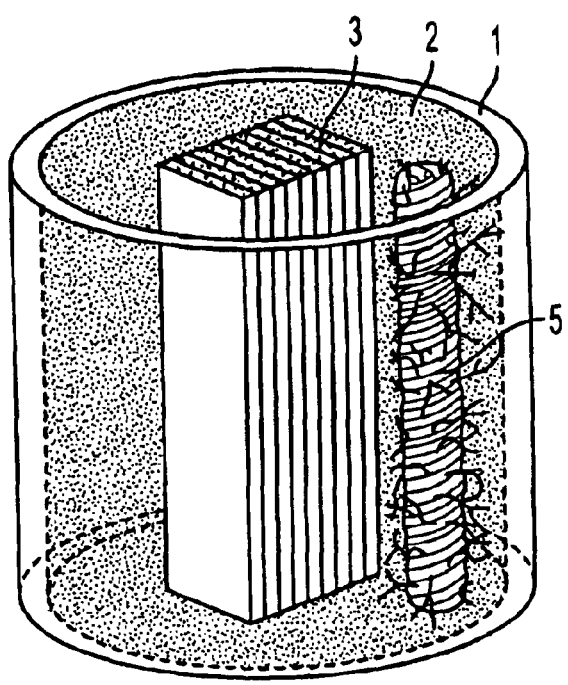
FIG. 6 is a perspective view of a buffer tube according to a preferred embodiment of the present invention.

Referring to FIG. 6, the present invention solves many of the problems created when a buffer tube 1 containing a single ribbon or single stack of ribbons 3 centrally located and surrounded by gel compound 2, is heated. The buffer tube 1 can be made of any type material and can be any shape. Generally, the buffer tube 1 is cylindrical in shape. The fiber optic ribbons 3 can be assembled in stacks (as shown) or can be individual if necessary. The gel compound 2 is also not limited in any manner.

Figure 8:
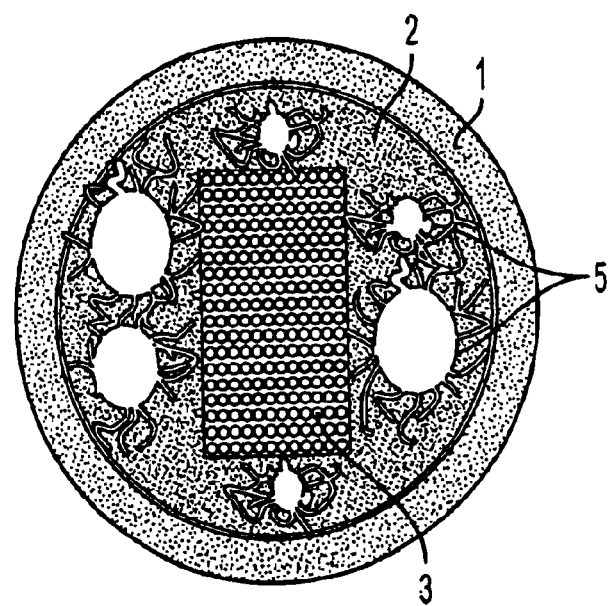
FIG. 8 is a plan view of the buffer tube of FIG. 6.

The present invention, as shown in FIG. 6, embeds gel swellable yarns 5 in the gel compound 2, between the walls of the buffer tube 1 and the fiber optic ribbon stack 3. The gel swellable yarns 5 can be disposed in a number of ways. For example, the gel swellable yarns 5 can run axially parallel to the fiber optic ribbon 3 or even be wrapped around the fiber optic ribbon 3 in a helical manner. The gel swellable yarns 5 do not have to be evenly dispersed within the buffer tube 1. For example, the gel swellable yarns 5 can be places closer to the buffer tube walls 1 than to the fiber optic ribbons 3. Although FIG. 6 shows only one gel swellable yarn 5, any number of yarns can be used. As shown in FIG. 8, the size and shape of the yarns can vary as well as the type. For example, although the figures show the yarns 5 with whiskers, the present invention can be practiced using gel swellable yarns 5 with or without whiskers. Gel swellable yarns 5 can also be replaced by gel swellable tape or any other material that volumetrically expands when in contact with gel compound 2.

Figure 7:
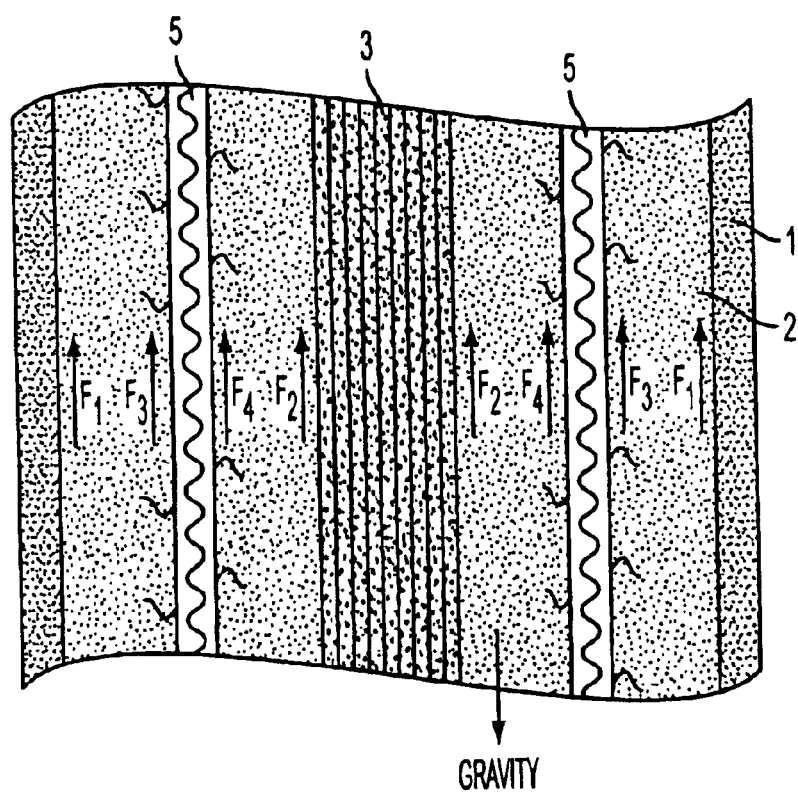
FIG. 7 is a side view of the buffer tube of FIG. 6 showing the forces acting on the gel compound when gel swellable yarns are embedded in the gel compound.

As described earlier, a problem arises when the buffer tube 1 and gel compound 2 become heated. By adding the gel swellable yarns 5, the problem of the gel compound 2 flowing downward can be diminished. As shown in FIG. 7, adding gel swellable yarns 5 to the buffer tube 1 results in two additional upward forces F3, F4 that help prevent the gel compound 2 from running downward.

The addition of the gel swellable yarns 5 increases the amount of surface area with which the gel compound 2 may contact. The additional surface area results in two additional forces F3, F4 that act upon the gel compound 2. As a result, more upward forces can be transmitted to compound 2.

Additionally, by selecting yarn and/or particles having a CTE which is less than the CTE of the gel compound 2, the CTE of the gel-yarn or gel-particle system is lowered. In fact, it is possible to select yarns and particles having a negative CTE (i.e. yarns/particles that volumetrically contract when heated). In a preferred embodiment, yarns and/or particles are selected in such a manner that the resulting CTE of the gel-yarn or gel-particle system matches or is substantially equivalent to the CTE of the buffer tube 1. Consequently, when heated, both the buffer tube 1 and the gel-yarn/gel-particle system expand by the same amount. As a result, gel compound 2 is not "forced" out of the buffer tube 1 in the axial direction.

Equations governing the flow of gels within vertical tubes can be developed based on the following assumptions:

Laminar, axisymmetric, steady state flow

Incompressible, homogeneous fluid (no oil separation/single phase)

No end effect

No slip condition

Bingham model is applicable to the Non-Newtonian water-blocking gel.

Figure 1:
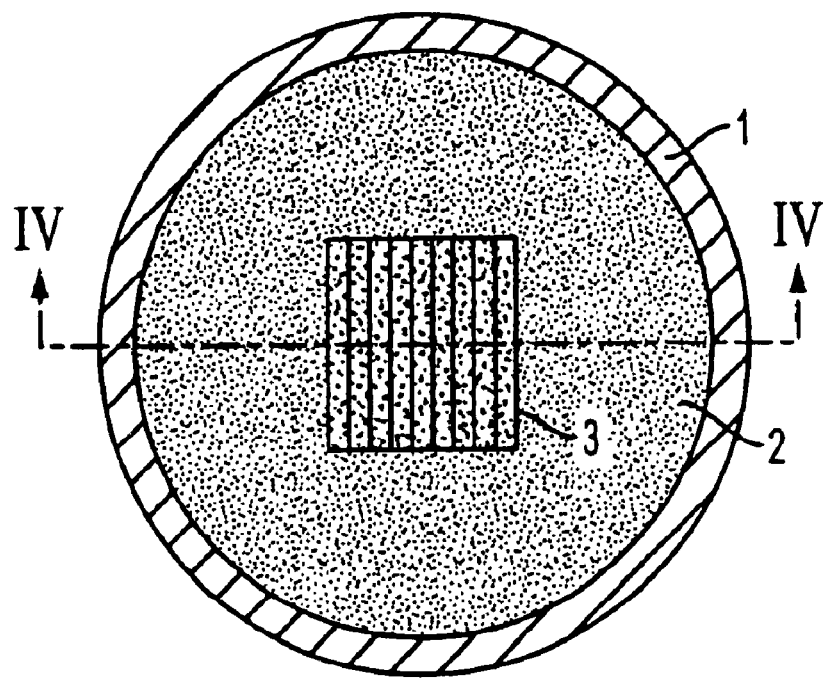
FIG. 1 is a plan view of a conventional buffer tube.
Figure 2:
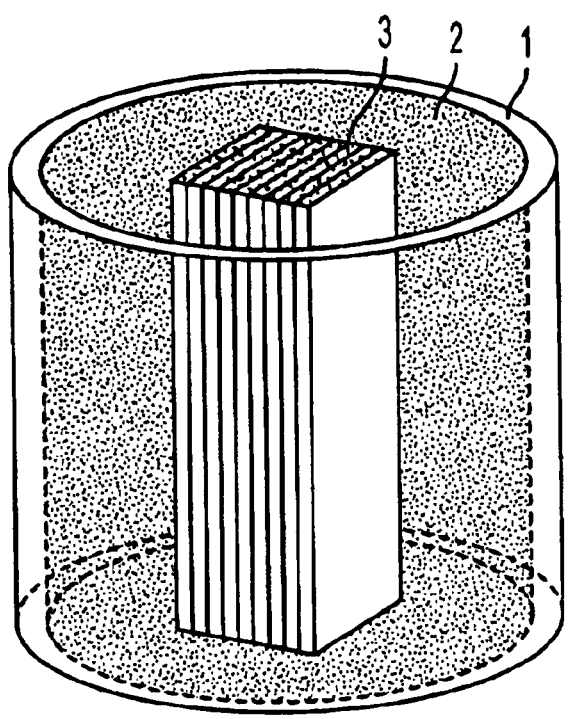
FIG. 2 is a side view of a conventional buffer tube with a transparent front of the buffer tube.
Figure 3:
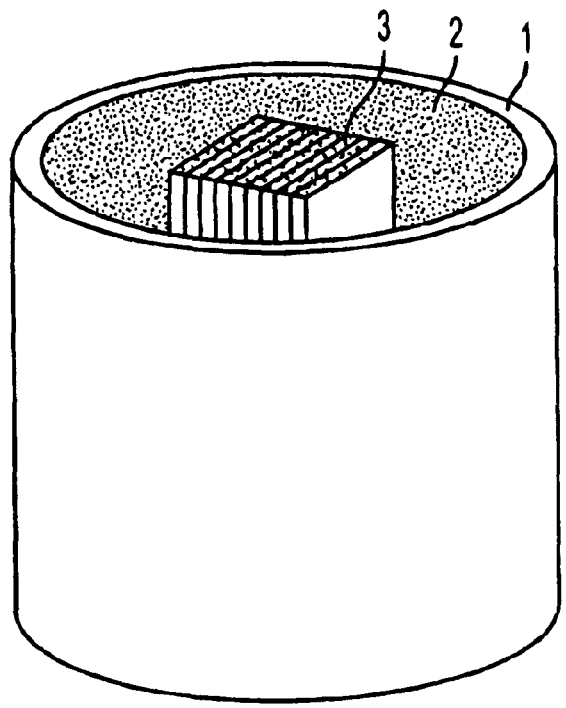
FIG. 3 is a side view of a conventional buffer tube.
Figure 4:
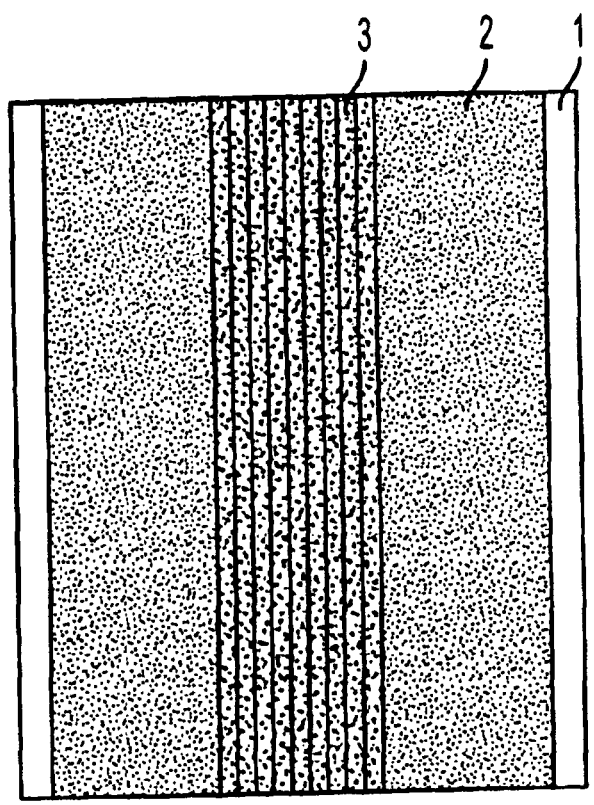
FIG. 4 is a side view of a conventional buffer tube taken along the IV—IV line of FIG. 1.
Figure 5:
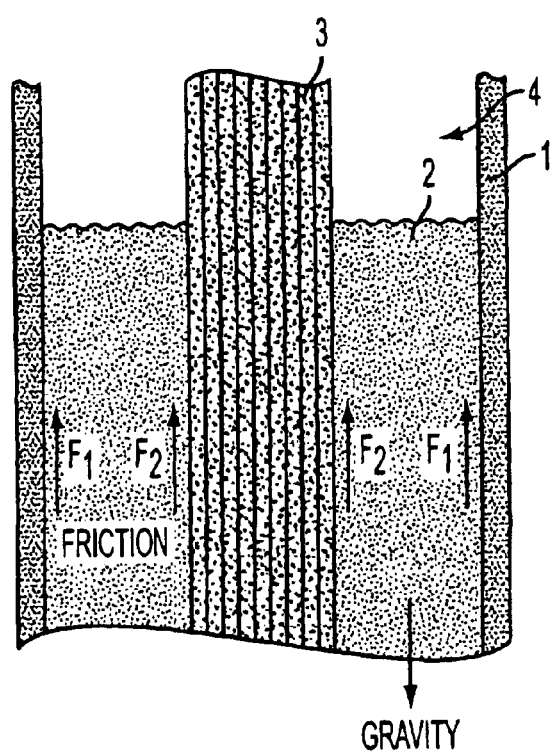
FIG. 5 is side view of a conventional buffer tube taken along the IV—IV line of FIG. 1 showing the forces acting on the gel compound when the temperature of the buffer tube is increased.

By performing the momentum balance on the controlled volume as shown in FIG. 1, and applying the above assumptions, the following equation can be obtained:

$$\frac{d}{dr}(r\tau_{rz}) = \frac{P_0 - P_L - \rho g L}{L} r \quad (1)$$

Where, $\tau_{rz}$ is the shear stress in z direction at a radius r; $\rho$ is the density of the fluid; L is the length of the tube; $P_0$ is the pressure at l=0; $P_L$ is the pressure at l=L.

Boundary conditions for the above equation are as follows:

At r=0, $\tau_{rz}$=Finite  (2)

At r=R, $v_{z=0}$(no slip condition)  (3)

For a fluid, $\tau_{rz}$ can be expressed by the following equations using the Bingham model:

$\tau_{rz}=\tau_0-\mu_0 dv_z/dr$ for $r_0 \leq r \leq R$  (4)

$\tau_{rz}=\tau_0-\mu_0$ for $0 \leq r \leq r_0$  (5)

Where $r_0=2L\tau_0/(P_0-P_L+\rho g L)$  (6)

Equation 1 can be solved along with Equations (2)–(6) for the volumetric flowrate, Q. Q is given by:

$$Q = \frac{\pi \tau_0}{\mu_0}\left[\frac{1}{4A}(R^4 - r_0^4) - \frac{1}{3}(R^3 - r_0^3)\right] \quad (7)$$

Where $r_0=2L\tau_0/(P_0-P_L+\rho g L)$  (8)

To incorporate the effects of thermal expansion differences of the gel and tube materials, it is necessary to calculate the change in volume associated with these differences. The change in volume is given by:

$\Delta V_T = \Delta V_{gel@T} - \Delta V_{tube@T}$  (9)

Where $\Delta V_{gel@T} = Al\beta_{gel}\Delta T$  (10)

$\Delta V_{tube@T} = Al\beta_{tube}\Delta T$  (11)

$\Delta V_T$ is the extruded volume of gel at temperature, T.

$\Delta V_{gel@T}$ is the volume change of the gel at temperature, T.

$\Delta V_{tube@T}$ is the volume change of the tube at temperature, T

A is the area of the inside of the tube.

$\beta_{gel}$ is volumetric coefficient of thermal expansion of the gel.

$\beta_{tube}$ is volumetric coefficient of thermal expansion of the tube.

$\Delta T$ is the difference between the filling and test temperatures.

After substituting and rearranging, the equation becomes $\Delta V_T = Al_o \Delta T(\beta_{gel}-\beta_{tube})$.  (12)

To predict the amount of gel flow to be extruded due to differences in thermal expansion between the gel and tube, one simply rearranges the density equation to obtain:

Mass(g)=$\Delta V_T \rho_{gel@T}$  (13)

Now that the volume and mass of the extruded gel at some temperature, T, is known, it is possible to calculate the yield stress required by the gel material to prevent drip. This can be accomplished by the following relationship assuming that the change in the radius due to thermal expansion is small.

$\tau_0' = F/A = mg/A$  (14)

Where, $\tau_0'$ is the stress associated with the extruded gel; F represents a force; A is the area of the inside of the tube, m is the mass of the extruded gel at temperature T; g is the acceleration due to gravity which equals 980 cm/s².

The minimum yield stress value of the gel for a "no flow" condition can be predicted by the greater of the two values obtained from $\tau_0$ and $\tau'_0$.

Also, since the gel swellable yarns 5 occupy some of the volume inside the buffer tube 1, less gel compound 2 may consequently be used. Using less gel compound 2 results in at least two beneficial effects. First, since gel compound 2 is expensive, using less means the cost of manufacturing the fiber optic cable is decreased. Second, since the force acting in the downward direction (i.e. gravity) is a function of the mass of the gel compound 2, replacing some of the gel compound with yarns having less mass than the gel compound decreases the downward force due to gravity. A decrease in the force of gravity means that less upward force (i.e. friction forces F1, F2, F3, and F4) is needed to keep the gel compound 2 from running down the fibers. When the gel compound 2 is held in place, it prevents the fiber optic ribbons 3 from contacting the walls of the buffer tube 1 and also prevents other materials (i.e. water) that might penetrate the buffer tube 1 from contacting the fiber optic ribbons 3.

Figure 9:
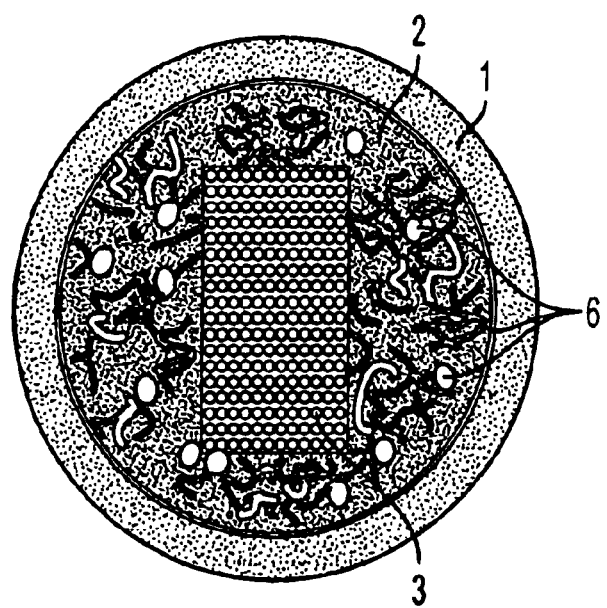
FIG. 9 is an overhead view of another embodiment of the present invention when gel swellable particles are embedded in the gel compound.

These same principles hold true when gel swellable particles 6 are embedded in the gel compound 2 as shown in FIG. 9. When the gel swellable particles 6 come into contact with the gel compound 2, the gel swellable particles 6 begin to volumetrically expand. This volumetric expansion of the gel swellable particles 6, much like the expansion of the gel swellable yarns 5, pushes the gel compound 2 against the buffer tube wall 1 and the fiber optic ribbons 3 which in turn increases the upward friction forces. The gel swellable particles 6 also increase the surface area that the gel compound contacts, thereby creating additional friction forces that act in the upward direction. Finally, the gel swellable particles 6 occupy some of the volume inside the buffer tube 1, which decreases the amount of gel compound 2. This decrease the gravitational force that acts on the gel compound in the downward direction.

Figure 10:
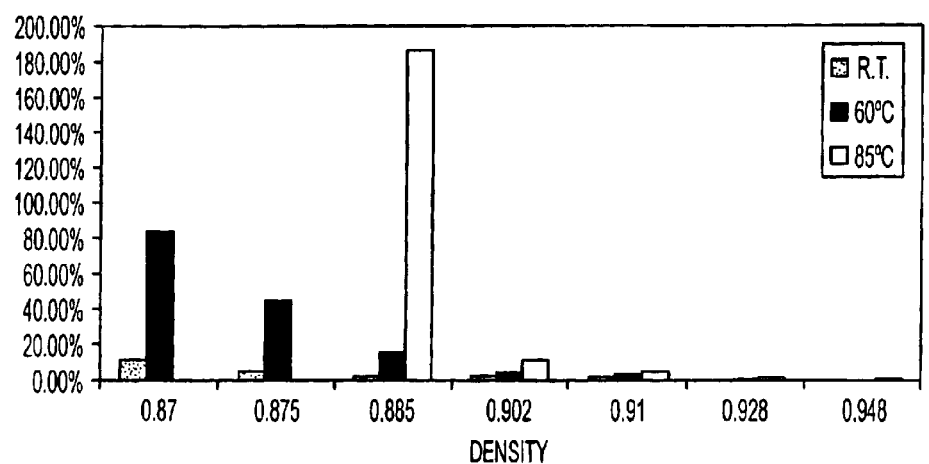
FIG. 10 is a chart showing the effects of temperature on the swelling of Polyethylene.
Figure 11:
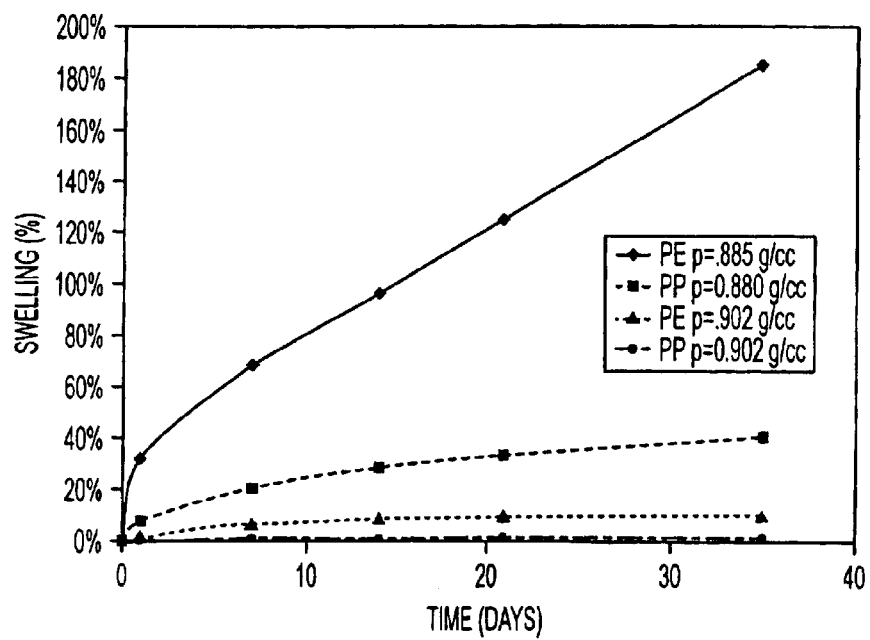
FIG. 11 is a chart showing the effect of material type and density on the swelling of the materials at 85° C.

The gel swellable particles 6 are not limited by shape or size or the number or amount used within the buffer tube. Several polyolefin copolymers suitable for use as gel swellable particles or for use within the yarns in the present invention, have been identified. FIG. 10 depicts the swelling (% swelling on the vertical axis) of polyethylene as a function of temperature (Room Temperature, 60° C., and 85° C.) and density, and FIG. 11 depicts the effect of material type and density on swelling at 85° C., where PE is a polyethylene material and PP is a polypropylene material. As shown in FIG. 10, the swellability of different material densities at 85° C. can be anywhere from moderately swelled to totally miscible. It is desirable to have a gel-swellable material where the swellability varies as a function of temperature. Further, it is desirable to have the material chosen for the gel-swellable particles or yarns be softer than that used for the outer jacket or tube 10, which is normally a polypropylene copolymer type material, which typically has a density greater than 0.900 g/c³. Typically, swelling of the jacket materials at 85° C. reaches a maximum value of less than 3% with a polyolefin oil based gel. (The characteristics of such a gel are discussed in U.S. Pat. No. 6,085,009). As shown in FIG. 11, both polethylenes and polypropylenes with a density below about 0.89 g/c³ are substantially swellable with a polyolefin based gel. Therefore, when this type of material is used for the gel-swellable yarns or particles, the gel-swellable layer will absorb some of the gel while the buffer tube or jacket 10 would remain substantially unaffected.

The gel-swellable materials include ethylene-octene copolymers, propylene-ethylene copolymers, ethylene-octene-propylene terpolymers or other similar copolymers or terpolymers. Other suitable materials useful class of compounds for such an application, which are highly swellable, are ethylene-styrene interpolymers. In the preferred embodiment, low-density polyethylene, with a density less than 0.90 g/cc is used as the gel-swellable material.

Further, gel swellable particles 6 having whiskers provide even more surface area but gel swellable particles 6 without whickers may also be used. Additionally, any combination of gel swellable yarns, tapes and particles may be used. The yarns may also be used to "drag" the gel compound 2 into the buffer tube 1 which speeds manufacturing of the buffer tubes 1. Finally, the gel swellable yarns may be oriented axially parallel or disposed helically around the fiber optic ribbons 3.

The buffer tubes of the present invention can be made in a number of ways. The yarns most likely will be applied during the buffering/stranding process of the ribbon buffer tubes. The yarns are wound onto a delivery spool and then delivered along with the other optical units into the tube while the polymer is being extruded. That is, ribbons are "stranded" and then "buffered" usually in a single process step. These terms, (stranded and buffered) are commonly used for manufacturing optical units in the industry. The advantages to this are 1) being able to control yarn tensions (which are critical to maintain desired stack integrity) and 2) applying them in the "stacks" "final" formation just prior to entering the buffer tube. Also, it allows you to apply them in the desired helical formation of the "stack". The "stack" can then orient itself in an ideal center position—cushions will help to center the stack within the polymer tube, which can prevent attenuation degradation due to the potential for the optical units to engage the tube wall.

The buffer tubes of the present invention can be made in a number of ways. Typically, an assembled stack of fiber ribbons is pulled through a die. Gel compound is injected in the die (from the inside) and a hot thermoplastic material is extruded over the gel-stack system (from the outside) to form a buffer tube with gel and ribbons inside. The buffer tube is then moved through a water-cooling channel and wound on the reel. In a preferred embodiment, the gel swellable yarns 5 are pulled with the assembled stack of fiber ribbons through the die.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A fiber optic buffer tube comprising:
   at least one optical fiber having a coefficient of thermal expansion disposed within said buffer tube;
   gel compound having a coefficient of thermal expansion disposed within said buffer tube, wherein said gel compound is disposed between said at least one optical fiber and said buffer tube; and
   at least one gel swellable material having a coefficient of thermal expansion disposed within said buffer tube.

2. The fiber optic buffer tube of claim 1, wherein said at least one optical fiber is circumferentially arranged within said buffer tube.

3. The fiber optic buffer tube of claim 1, wherein said at least one optical fiber is a fiber optic ribbon.

4. The fiber optic buffer tube of claim 1, wherein said at least one optical fiber is a bundle of fibers.

5. The fiber optic buffer tube of claim 1, wherein said at least one gel swellable material is gel swellable yarn.

6. The fiber optic buffer tube of claim 1, wherein said at least one gel swellable material is gel swellable particles.

7. The fiber optic buffer tube of claim 5, wherein said gel swellable yarn has whiskers.

8. The fiber optic buffer tube of claim 6, wherein said gel swellable particles have whiskers.

9. The fiber optic buffer tube of claim 1, wherein the coefficient of thermal expansion of said at least one gel swellable material is less than the coefficient of thermal expansion of said gel compound.

10. The fiber optic buffer tube of claim 1, wherein the coefficient of thermal expansion of said at least one gel swellable material is less than the coefficient of thermal expansion of said buffer tube.

11. The fiber optic buffer tube of claim 1, wherein said gel compound and said at least one gel swellable material form a gel system having a coefficient of thermal expansion, and wherein the coefficient of thermal expansion of said gel system is matched to the coefficient of thermal expansion of said buffer tube.

12. The fiber optic buffer tube of claim 1, wherein said at least one gel swellable material includes a first type gel swellable material and a second type gel swellable material; and
   wherein said first type gel swellable material is different than said second type gel swellable material.

13. The fiber optic buffer tube of claim 12, wherein said first type gel swellable material is gel swellable yarn and said second type gel swellable material is gel swellable particles.

14. The fiber optic buffer tube of claim 12, wherein said first type gel swellable material is gel swellable yarn and said second type gel swellable material is gel swellable tape.

15. The fiber optic buffer tube of claim 12, wherein said first type gel swellable material is gel swellable tape and said second type gel swellable material is gel swellable particles.

16. The fiber optic buffer tube of claim 1 wherein said at least one gel swellable material volumetrically expands when heated.

17. The fiber optic buffer tube of claim 1 wherein said at least one gel swellable material volumetrically contracts when heated.

18. The fiber optic buffer tube of claim 5, wherein said gel swellable yarn is arranged axially parallel to said at least one optical fiber.

19. The fiber optic buffer tube of claim 5, wherein said gel swellable yarn is helically disposed around said at least one optical fiber.

20. A method of improving gel compound flow performance of a gel-filled fiber optic buffer tube having a coefficient of thermal expansion and having at least one optical fiber, comprising:
   embedding at least one gel swellable material having a coefficient of thermal expansion within said buffer tube, wherein said gel compound has a coefficient of thermal expansion.

21. The method of improving gel compound flow performance of a gel-filled fiber optic buffer tube having at least one optical fiber of claim 20, wherein said at least one optical fiber is circumferentially arranged within said buffer tube.

22. The method of improving gel compound flow performance of a gel-filled fiber optic buffer tube having at least one optical fiber of claim 20, wherein said at least one gel swellable material is gel swellable yarn.

23. The method of improving gel compound flow performance of a gel-filled fiber optic buffer tube having at least one optical fiber of claim 20, wherein said at least one gel swellable material is gel swellable particles.

24. The method of improving gel compound flow performance of a gel-filled fiber optic buffer tube having at least one optical fiber of claim 20, wherein said gel swellable yarn has whiskers.

25. The method of improving gel compound flow performance of a gel-filled fiber optic buffer tube having at least one optical fiber of claim 21, wherein said gel swellable particles have whiskers.

26. The method of improving gel compound flow performance of a gel-filled fiber optic buffer tube having at least one optical fiber of claim 20, wherein the coefficient of thermal expansion of said at least one gel swellable material is less than the coefficient of thermal expansion of said gel compound.

27. The method of improving gel compound flow performance of a gel-filled fiber optic buffer tube having at least one optical fiber of claim 20, wherein the coefficient of thermal expansion of said at least one gel swellable material is less than the coefficient of thermal expansion of said buffer tube.

28. The method of improving gel compound flow performance of a gel-filled fiber optic buffer tube having at least one optical fiber of claim 20, wherein said gel compound and said at least one gel swellable material form a gel system having a coefficient of thermal expansion, and wherein the coefficient of thermal expansion of said gel system is matched to the coefficient of thermal expansion of said buffer tube.

29. The method of improving gel compound flow performance of a gel-filled fiber optic buffer tube having at least one optical fiber of claim 20, wherein said at least one gel swellable material includes a first type gel swellable material and a second type gel swellable material; and
wherein said first type gel swellable material is different than said second type gel swellable material.

30. The method of improving gel compound flow performance of a gel-filled fiber optic buffer tube having at least one optical fiber of claim 29, wherein said first type gel swellable material is gel swellable yarn and said second type gel swellable material is gel swellable particles.

31. The method of improving gel compound flow performance of a gel-filled fiber optic buffer tube having at least one optical fiber of claim 29, wherein said first type gel swellable material is gel swellable yarn and said second type gel swellable material is gel swellable tape.

32. The method of improving gel compound flow performance of a gel-filled fiber optic buffer tube having at least one optical fiber of claim 29, wherein said first type gel swellable material is gel swellable tape and said second type gel swellable material is gel swellable particles.

33. The method of improving gel compound flow performance of a gel-filled fiber optic buffer tube having at least one optical fiber of claim 20, wherein said at least one gel swellable material volumetrically expands when heated.

34. The method of improving gel compound flow performance of a gel-filled fiber optic buffer tube having at least one optical fiber of claim 20, wherein said at least one gel swellable material volumetrically contracts when heated.

35. The method of improving gel compound flow performance of a gel-filled fiber optic buffer tube having at least one optical fiber of claim 22, wherein said gel swellable yarn is arranged axially parallel to said at least one optical fiber.

36. The method of improving gel compound flow performance of a gel-filled fiber optic buffer tube having at least one optical fiber of claim 22, wherein said gel swellable yarn is helically disposed around said at least one optical fiber.

37. A method of forming an optical fiber member comprising the following steps:
providing at least one optical fiber having a coefficient of thermal expansion;
providing a gel compound having a coefficient of thermal expansion along said optical fiber;
providing at least one gel swellable material having a coefficient of thermal expansion along said optical fiber; and
forming a conduit around said optical fiber, said gel compound, and said gel swellable material such that when said gel swellable material contacts said gel compound, said gel swellable material expands volumetrically within said conduit.

38. The method of forming an optical fiber member of claim 37, wherein said gel swellable material has whiskers.

39. The method of forming an optical fiber member of claim 38, further comprising:
dragging said gel into said conduit using said gel swellable material.

* * * * *